United States Patent
Bricko

(10) Patent No.: US 10,398,136 B2
(45) Date of Patent: Sep. 3, 2019

(54) ILLUMINATED-HEATED ICE FISHING SYSTEM

(71) Applicant: Joseph Thomas Bricko, Farmington, MN (US)

(72) Inventor: Joseph Thomas Bricko, Farmington, MN (US)

(*) Notice: Subject to any disclaimer, the term of this patent is extended or adjusted under 35 U.S.C. 154(b) by 491 days.

(21) Appl. No.: 14/835,454

(22) Filed: Aug. 25, 2015

(65) Prior Publication Data

US 2016/0050899 A1 Feb. 25, 2016

Related U.S. Application Data

(60) Provisional application No. 62/041,231, filed on Aug. 25, 2014.

(51) Int. Cl.
*A01K 97/01* (2006.01)
*A01K 97/00* (2006.01)
*A01K 97/12* (2006.01)

(52) U.S. Cl.
CPC .............. *A01K 97/01* (2013.01); *A01K 97/00* (2013.01); *A01K 97/12* (2013.01); *A01K 97/125* (2013.01)

(58) Field of Classification Search
CPC ........ A01K 97/01; A01K 97/00; A01K 97/12; A01K 97/125
USPC .............................. 43/4, 17, 17.5; 220/6, 4.29
See application file for complete search history.

(56) References Cited

U.S. PATENT DOCUMENTS

| | | | | | |
|---|---|---|---|---|---|
| 2,483,787 | A | * | 10/1949 | Sheraski | A01K 97/06 126/271.3 |
| 2,618,091 | A | * | 11/1952 | Sheraski | A01K 97/12 126/25 R |
| 3,025,852 | A | * | 3/1962 | Quilling | A01K 97/01 126/271.2 R |
| 3,170,458 | A | * | 2/1965 | Anderlie | F24C 1/16 126/271.3 |
| 4,006,732 | A | * | 2/1977 | Schumm | A01K 97/01 126/271.1 |
| 4,131,107 | A | * | 12/1978 | Godbout | A01K 97/01 126/271.2 R |
| 4,918,853 | A | * | 4/1990 | Bascom | A01K 97/01 135/901 |
| 4,980,986 | A | * | 1/1991 | Harper | A01K 97/01 43/17 |
| 5,074,072 | A | * | 12/1991 | Serocki | A01K 97/01 43/16 |
| 5,157,855 | A | * | 10/1992 | Schmidt | A01K 97/01 43/17 |
| 5,282,333 | A | * | 2/1994 | Klinkhamer | A01K 97/01 43/4 |

(Continued)

*Primary Examiner* — Darren W Ark
*Assistant Examiner* — Christopher D Hutchens
(74) *Attorney, Agent, or Firm* — Greg N. Geiser; Gutwein Law

(57) ABSTRACT

An illuminated-heated ice fishing system. The system includes a plurality of sidewalls and a top wall in hinged communication and wherein the device is capable of folding up for storage. The system includes a heated lantern to heat and illuminate a spool of the device. The spool is removably affixed to a sidewall of the device and includes a reflective surface directed towards the interior of the device to reflect the light from the lantern. The sidewalls have a bottom portion comprised of a thermoplastic material for contacting the ice surface.

5 Claims, 8 Drawing Sheets

(56) References Cited

U.S. PATENT DOCUMENTS

| | | | | |
|---|---|---|---|---|
| 5,491,923 A * | 2/1996 | Zingrone | A01K 97/01 | |
| | | | 248/538 | |
| 5,598,656 A * | 2/1997 | Strasser | A01K 97/01 | |
| | | | 43/17 | |
| 6,088,945 A * | 7/2000 | Sanderfoot | A01K 97/01 | |
| | | | 126/271.1 | |
| 6,158,160 A * | 12/2000 | Sykes | A01K 97/01 | |
| | | | 43/17 | |
| 6,487,812 B2 * | 12/2002 | Johnson | A01K 97/01 | |
| | | | 43/17 | |
| 6,694,662 B1 * | 2/2004 | McClure | A01K 97/01 | |
| | | | 43/4 | |
| 6,935,067 B1 * | 8/2005 | Richter | A01K 97/01 | |
| | | | 43/4 | |
| 7,185,456 B1 * | 3/2007 | Schoenecker | A01K 97/01 | |
| | | | 43/17 | |
| 7,818,913 B1 * | 10/2010 | Hoglund | A01K 97/01 | |
| | | | 43/16 | |
| 8,176,672 B1 * | 5/2012 | Schmeisser | A01K 97/01 | |
| | | | 43/16 | |
| D774,631 S * | 12/2016 | Bricko | D23/317 | |
| 2008/0295876 A1 * | 12/2008 | Ouellette | A01K 97/01 | |
| | | | 135/87 | |
| 2012/0110890 A1 * | 5/2012 | Garrett | A01K 97/20 | |
| | | | 43/55 | |
| 2012/0210626 A1 * | 8/2012 | Manlick | A01K 97/01 | |
| | | | 43/4.5 | |
| 2014/0331543 A1 * | 11/2014 | Hancock | A01K 97/01 | |
| | | | 43/17 | |
| 2015/0237839 A1 * | 8/2015 | Hermanson | A01K 97/01 | |
| | | | 43/17 | |

* cited by examiner

ILLUMINATED-HEATED ICE FISHING SYSTEM

CROSS REFERENCE TO RELATED APPLICATIONS

This application claims priority to U.S. Provisional Patent Application No. 62/041,231 filed 25 Aug. 2014 to the above named inventor, and is herein incorporated by reference in its entirety.

FEDERALLY SPONSORED RESEARCH OR DEVELOPMENT

Not Applicable

SEQUENCE LISTING, A TABLE, OR A COMPUTER PROGRAM

Not Applicable

FIELD OF THE INVENTION

The present invention relates to an improved thermal box for use during ice fishing.

BACKGROUND OF THE INVENTION

When fishing in the winter in northern climates individuals are often required to drill a hole into the ice surface to provide access to the water and potential fish located below the surface of the ice. Often, this type of fishing is done in very cold weather and at temperatures well below freezing. Often over the course of a fishing expedition the holes that were drilled for access can re-freeze. This refreezing can cause problems with the retrieval of fish, damage lines and fishing equipment, and prevent lures and equipment from functioning properly.

To combat the problem of a fishing hole from refreezing, some anglers will utilize a heated compartment surrounding the fishing hole. This compartment is often a wooden or metal box with a heating element. Unfortunately, these boxes often have problems that become a nuisance during use. In particular, wooden boxes are susceptible to rot, water retention, and durability. Metal boxes as are found in the prior art are often susceptible to refreezing within the hole as metal is not an insulating material, susceptible to rust, corrosion, and are not portable.

Therefore, there is a need for an improved heated box for use in ice fishing. Preferably this heated box has a bottom that is constructed out of a non-corrosive and insulated material, is capable of folding for improved portability, and allows for the attachment of additional features.

SUMMARY OF THE INVENTION

The device of the present invention relates to an illuminated-heated ice fishing system. The device is provided in two configurations: an assembled configuration and a transport configuration. In the transport configuration, the device is folded to a substantially flat configuration for storage and transport. The system includes a plurality of sidewalls and a top wall in hinged communication. The sidewalls hingedly connected and forming a rectangular perimeter for placement around a hole for ice fishing. The top wall is affixed to the sidewalls and partially extends for the top opening of the device. The top wall includes a handle to aid in opening and access to the interior.

The bottom of the sidewalls includes a thermoplastic base for contacting the ice surface and preventing the device from freezing into the ice during use.

The device further includes a spool for placement onto a sidewall of the device. The spool rotating and providing for the placement of fishing line onto the spool. The spool includes a reflective material along one side. The reflective material increasing visibility and reflecting light generated from a lantern placed within the interior of the device.

The lantern for the device is placed within the interior of the device and situated below the top wall. The lantern is preferably powered by a disposable liquid propane tank.

The hinged communication of the sidewalls and the top wall allows the device to be easily folded when not in use. Preferably, the device is sized for receipt within a 5-gallon bucket for easy storage and transport.

BRIEF DESCRIPTION OF THE SEVERAL VIEWS OF THE DRAWING(S)

The accompanying drawings are included to provide a further understanding of the present invention and are incorporated in and constitute a part of this specification. The drawings illustrate exemplary embodiments of the present invention and together with the description serve to further explain the principles of the invention. Other aspects of the invention and the advantages of the invention will be better appreciated as they become better understood by reference to the Detailed Description when considered in conjunction with accompanying drawings, and wherein.

DETAILED DESCRIPTION OF THE INVENTION

Figure 1:
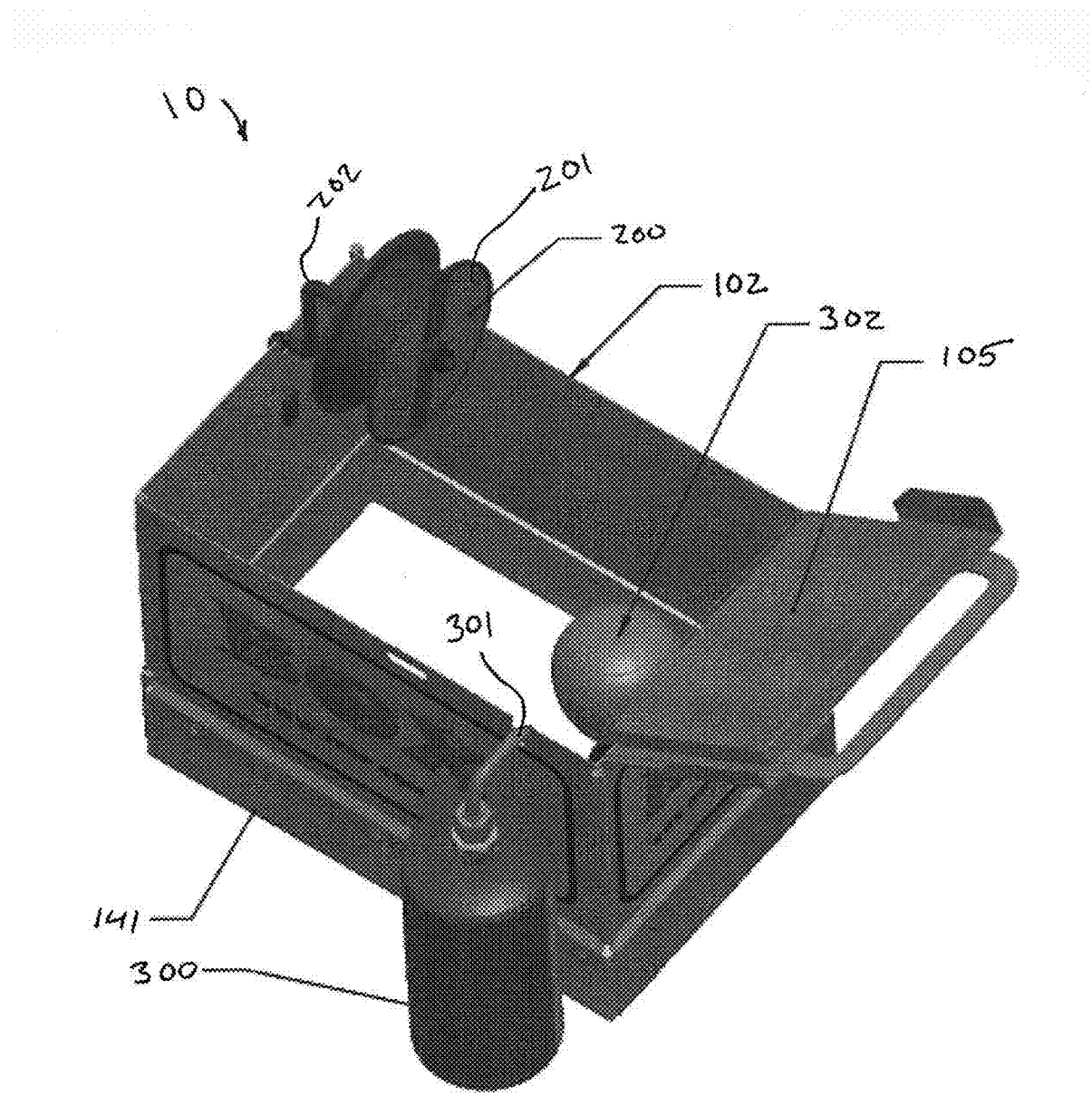
FIG. 1 is an isometric view of the illuminated-heated ice fishing system, according to the present invention.
Figure 2:
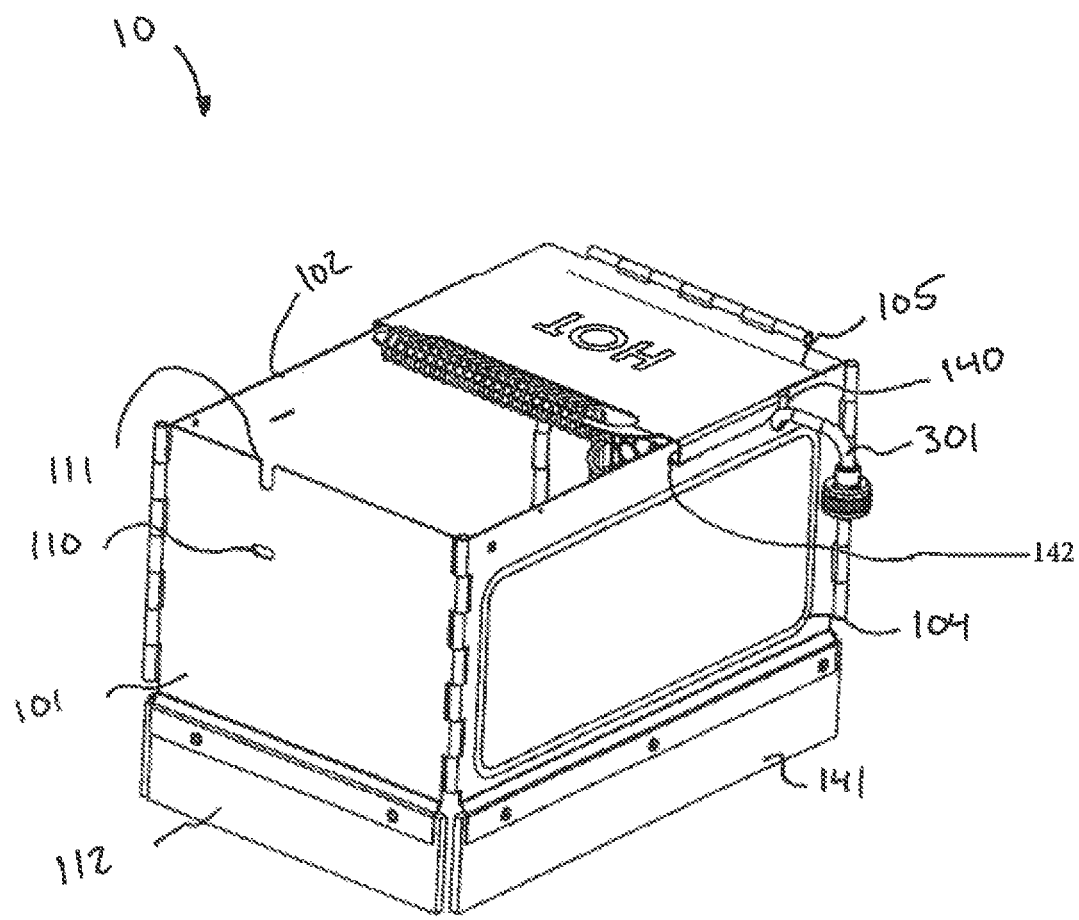
FIG. 2 is an isometric view of the illuminated-heated ice fishing system with some components removed, according to the present invention.
Figure 3:
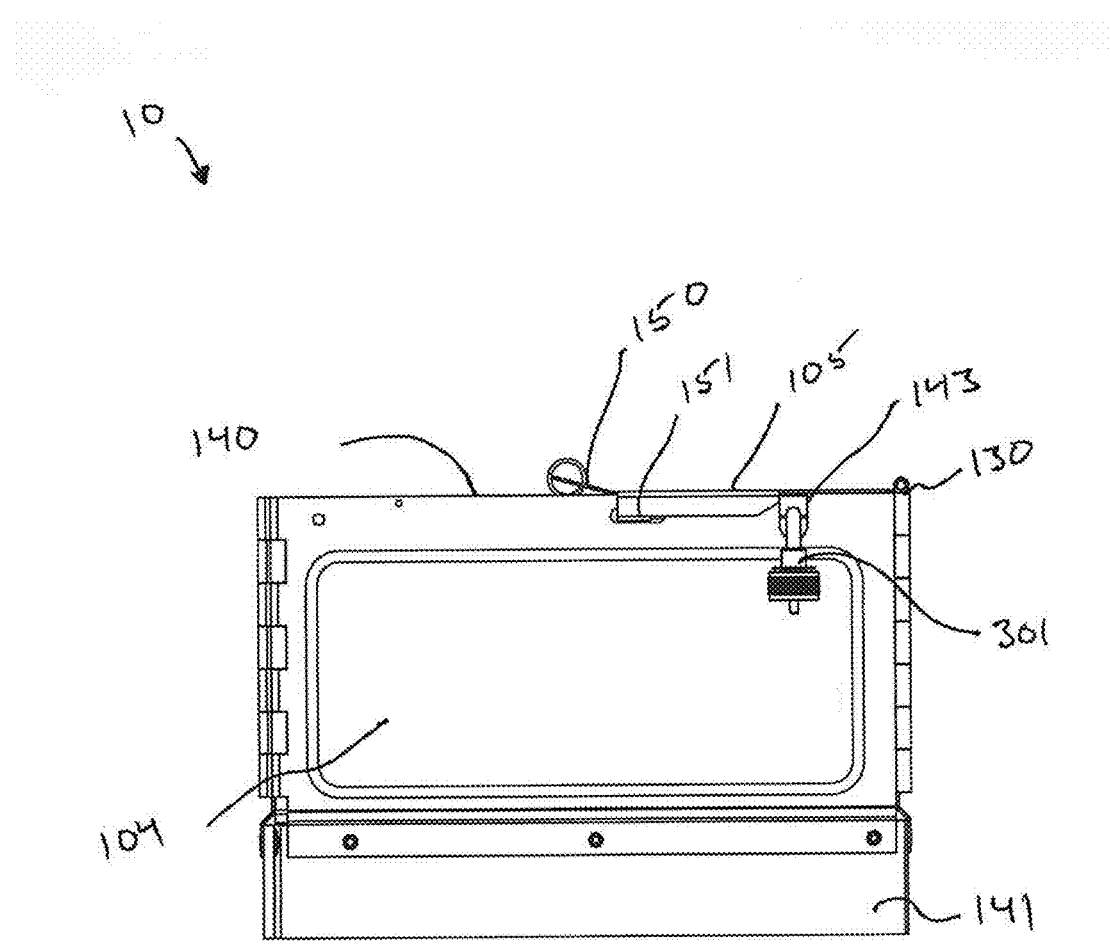
FIG. 3 is a front side view of the illuminated-heated ice fishing system, according to the present invention.
Figure 4:
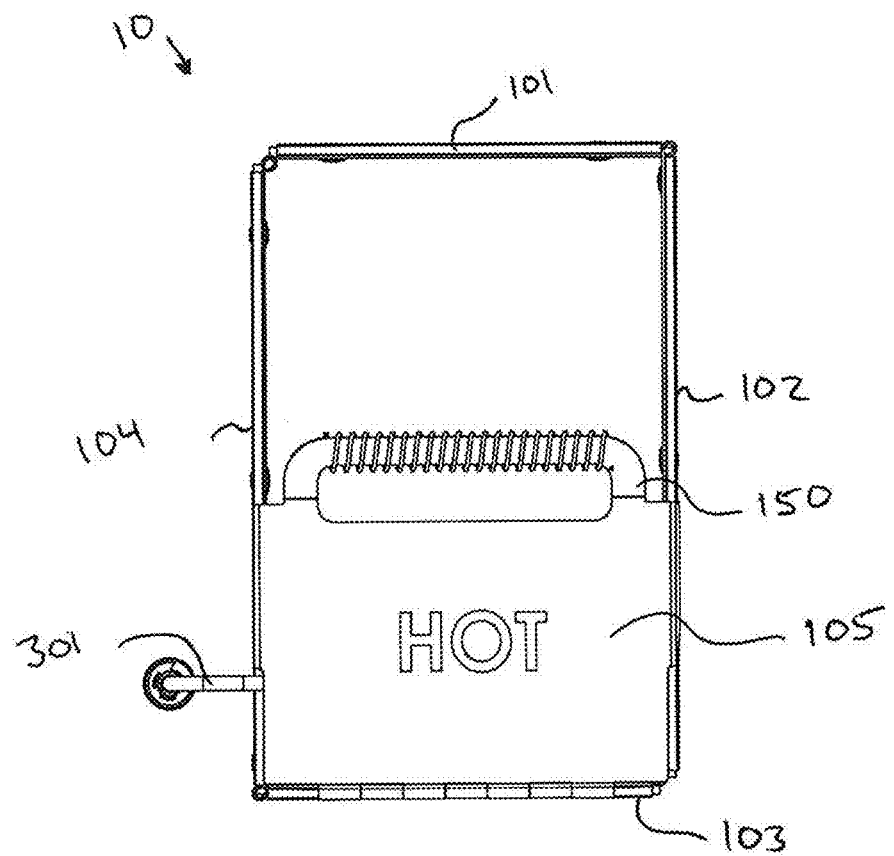
FIG. 4 is a top side view of the illuminated-heated ice fishing system, according to the present invention.
Figure 5:
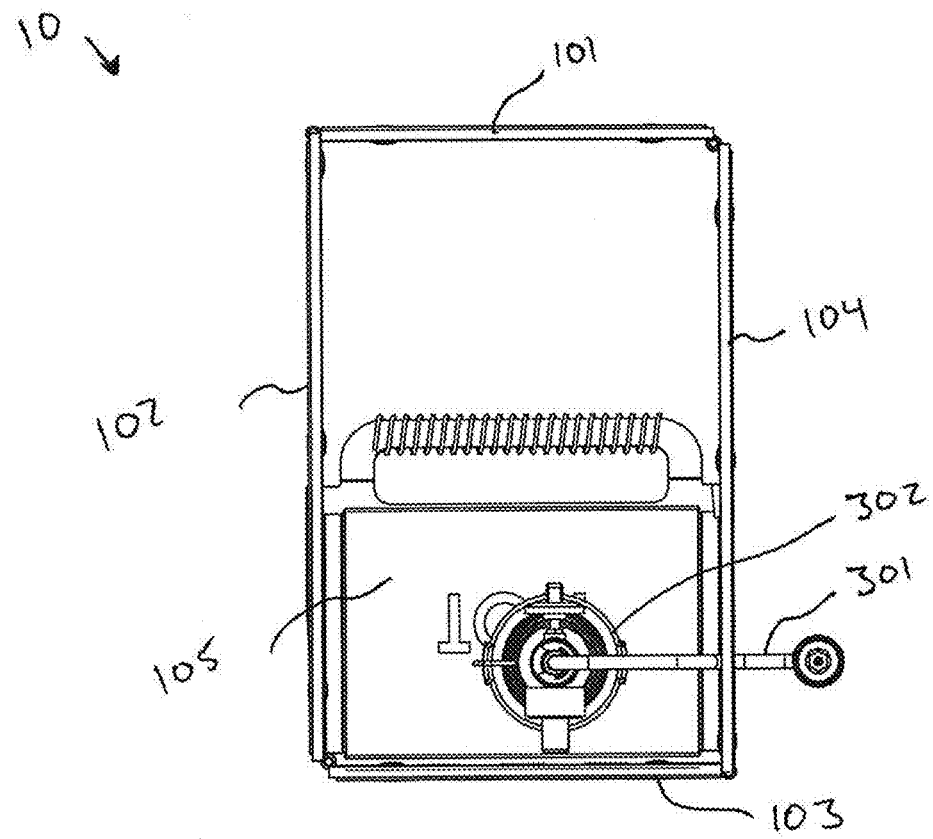
FIG. 5 is a bottom side view of the illuminated-heated ice fishing system, according to the present invention.
Figure 6:
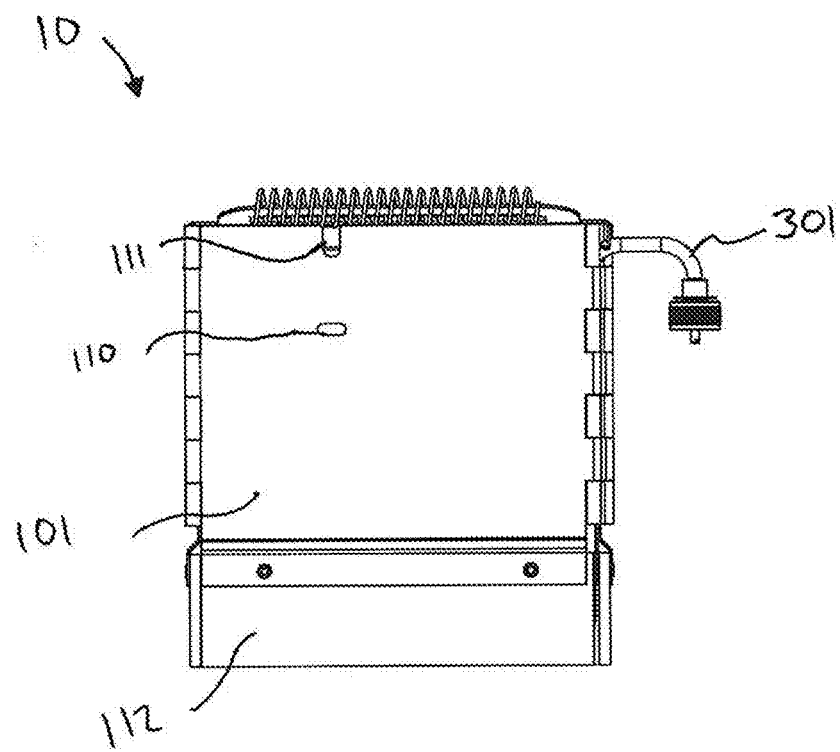
FIG. 6 is a left side view of the illuminated-heated ice fishing system, according to the present invention.
Figure 7:
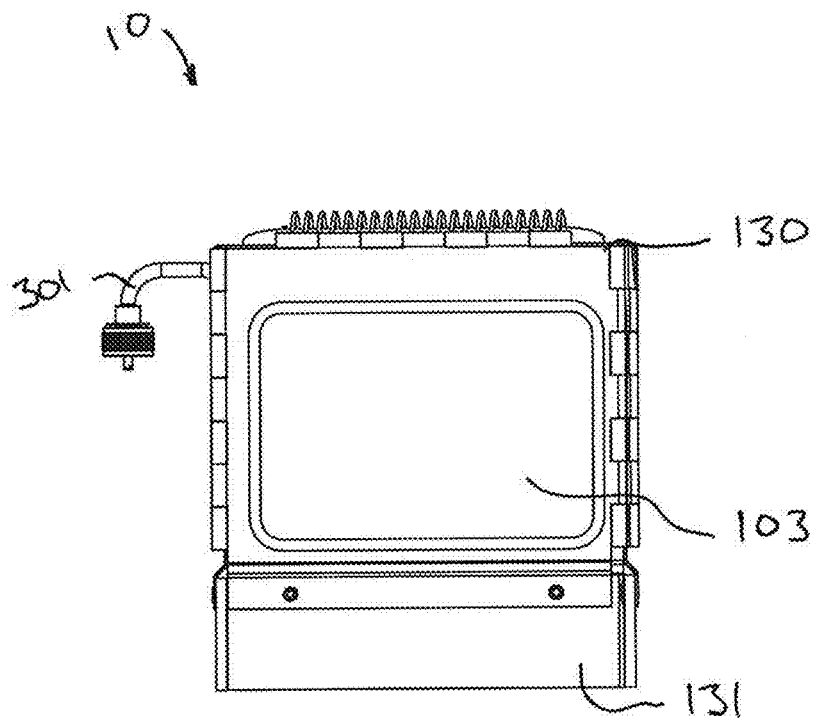
FIG. 7 is a right side view of the illuminated-heated ice fishing system, according to the present invention.

The following detailed description includes references to the accompanying drawing, which forms a part of the detailed description. The drawing shows, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the terms "front," "back," "rear," "upper," "lower," "right," and "left" in this description are merely used to identify the various elements as they are oriented in the FIGS, with "front," "back," and "rear" being relative to the apparatus. These terms are not meant to limit the elements that they describe, as the various elements may be oriented differently in various applications.

As used herein, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Figure 8:
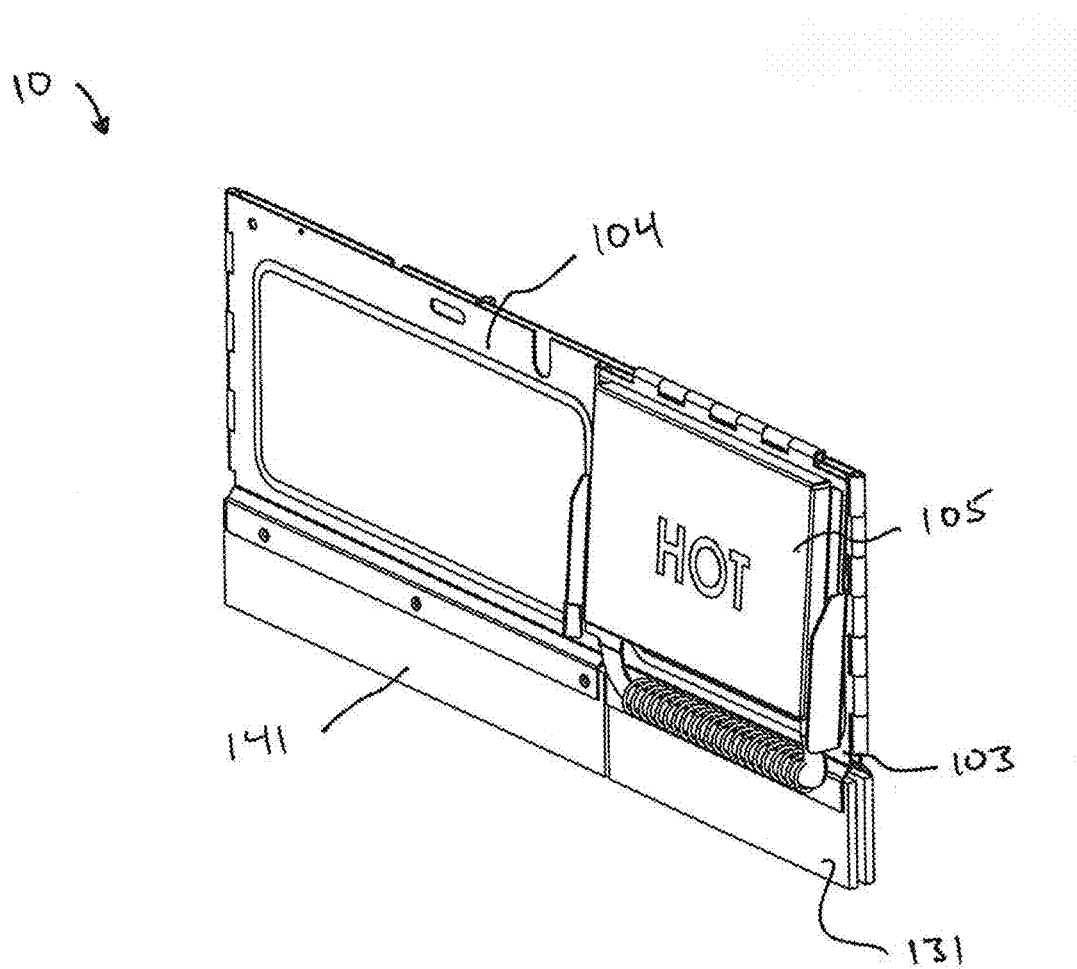
FIG. 8 is an isometric view of the illuminated-heated ice fishing system in its transport configuration, according to the present invention.

Referring now to FIG. 1-FIG. 8, the illuminated-heated ice fishing system of the present invention is generally referred to as device 10. The device 10 is primarily designed as a partial enclosure for an area around an ice-fishing hole. The device 10 is provided in two configurations: an assembled configuration (FIGS. 1-7) and a transport configuration (FIG. 8). In the transport configuration, the device 10 is folded to a substantially flat configuration for storage and transport. In the assembled configuration, the device 10 is rectangular in shape and comprised of four opposed sidewalls 101, 102, 103, 104 and a top wall 105 defining a perimeter of the device 10 and substantially enclosing an interior area of the device 10. The sidewalls 101-104 and top wall 105 are all in hinged communication with the sidewalls 101-104 coupled together, wherein the shape can be collapsed into a substantially flat configuration. In the preferred embodiment of the present invention, the size of the device 10 allows it to be stored within a standard 5-gallon bucket for transport and storage when it is in the transport configuration.

A first sidewall 101 forms an end wall of the device 10 opposite a third sidewall 103 and adjacent a second sidewall 102 and a fourth side wall 104. The first sidewall 101 includes a horizontal aperture 110 located through the exterior and below a notch 111 located in a top side of the first sidewall 101. The horizontal aperture 110 and notch 111 and allowing for the placement of a spool 200. The first sidewall 101 includes a first bottom surface 112, the first bottom surface 112 extending the width of the sidewall 101 and contacting the ice surface during use. The first bottom surface 112 is comprised of a thermoplastic material. This thermoplastic material allows the device 10 to be placed onto the surface of the ice without the device 10 freezing into the ice surface and creates a thermal break between the side walls 101-104 and the bottom surface.

The second sidewall 102 forms a wall of the device 10 and defining a length of the device 10. The second side wall 102 opposite the fourth sidewall 104 and adjacent to the first sidewall 101 and the third sidewall 103. The second side wall 102 includes a second bottom surface 121, the second bottom surface 121 comprised of a thermoplastic material extending the width of the side wall 102 and contacting the ice surface during use.

The third sidewall 103 forms a second end wall of the device 10 opposite the first sidewall 101 and adjacent to the second sidewall 102 and fourth sidewall 104. The third side wall 103 includes a third bottom surface 131, the third bottom surface 131 comprised of a thermoplastic material extending the width of the side wall 103 and contacting the ice surface during use. The third sidewall 103 includes an upper side 130. The upper side 130 forming an attachment point for the hinged and pivotal coupling of the top wall 105.

The fourth sidewall 104 forms a wall of the device 10 opposite the second sidewall 102 and adjacent to the first sidewall 101 and the third sidewall 103. The fourth side wall 104 includes a fourth bottom surface 141, the fourth bottom surface 141 comprised of a thermoplastic material extending the width of the side wall 104 and contacting the ice surface during use. The fourth sidewall 104 includes an upper edge 140. Adjacent to the third sidewall 103, the fourth sidewall 104 includes a second notch 143. The second notch 143 on the upper edge 140 and sized to receive a tube 301, the tube in communication with a removable gas canister 300 and a lantern 302, wherein the second notch 143 allows for access to the interior of the device 10. The fourth sidewall 104 additionally includes second aperture 142 sized to receive a catch 151 located on the top wall 105, wherein receipt of the catch 151 within the second aperture 142 secures the top wall 105 to the device 10.

The top wall 105 is hingedly coupled to the upper edge 130 of the third wall 103 and includes the catch 151 and handle 150. The top wall 105 partially covers the top of the device 10 with a length extending to approximately half of the length of the device 10, wherein access to the interior of the area surrounded by the device 10 is capable without opening of the top wall 105. The top wall 105 provides for a covering over the lantern 302 and aids in the retention of heat within the interior of the device 10. To aid in heat retention, the top wall 105 may be insulated. The top wall 105 catch 151 and its engagement within the second aperture 142 secures and stabilizes the device 10 when it is in use.

The spool 200 provides for the placement of a fishing line (not pictured) and includes a reflective surface 201. The reflective surface 201 placed on the spool 200 surface adjacent to the interior of the device 10, wherein illumination from the device 10 interior reflects off of the reflective surface 201 to increase visibility of the spool 200. The spool 200 is affixed to an arm 202 designed for receipt within the horizontal aperture 110 and notch 111. The arm 202 is cantilevered to engage both the aperture 110 and the notch 111 to allow for easy placement and removal. Additional to the reflective surface 201, the spool 200 may be in communication with a wireless strike indicator for remote notification of rotation of the spool 200.

To illuminate and heat the device 10 the canister 300 is affixed to the tube 301 in communication with the lantern 302. The ignition and burning of fuel within the lantern 302 provides illumination and heat. In the preferred embodiment of the present invention, the canister 300 is a disposable 1-pound liquid propane canister that is readily available.

In the preferred embodiment of the present invention, the device 10 is constructed out of a lightweight and corrosion resistant material, such as aluminum, although other similar materials may be used.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) but that the invention will include all embodiments falling with the scope of the specification.

What is claimed is:

1. An illuminated and heated ice fishing device for placement over a hole and placed onto an ice surface for ice fishing, the device comprising:
    a pair of end walls, the end walls opposite each other across a length of the device and having a bottom ice contacting surface, the bottom ice contacting surface composed of a thermoplastic material, a first end wall of the pair of end walls includes an upper edge, the upper edge having a notch and a horizontal aperture located below the notch;
    a pair of sidewalls, the sidewalls hingedly connected to each of the pair of end walls, the sidewalls having a bottom ice contacting surface, the bottom ice contacting surface composed of a thermoplastic material;
    a top wall, the top wall hingedly connected to a second end wall and partially enclosing a top of the device, wherein the pair of end walls, the pair of sidewalls, and the top wall form a perimeter of the device and enclose and define an interior of device in an assembled position, the device capable of transitioning to a folded and substantially flattened position when not in use; and
    a lantern, the lantern removably positioned within the interior of the device when the device is in the assembled position, the lantern providing heat and illumination to the device; and
    a spool, the spool received in the notch and the horizontal aperture of the first end wall, wherein the spool provides for placement of fishing line.

2. A device as in claim 1, wherein the spool includes a reflective material located on a side of the spool, the reflective material adjacent to the interior of the device, wherein the reflective material reflects the illumination from the lantern.

3. An illuminated and heated ice fishing device for placement over a hole and placed onto an ice surface for ice fishing, the device comprising:
    a first end wall and a second end wall, the end walls opposite each other across a length of the device and having a bottom ice contacting surface, the bottom ice contacting surface composed of a thermoplastic material, the first end wall includes an upper edge, the upper edge having a notch and a horizontal aperture located below the notch;
    a pair of sidewalls, the sidewalls hingedly connected to the end walls, the sidewalls having a bottom ice contacting surface, the bottom ice contacting surface composed of a thermoplastic material, one sidewa II of the pair of sidewalls including a second notch and a second aperture located near an upper edge and adjacent the second end wall;
    a top wall, the top wall hingedly connected to the second end wall and partially enclosing the top of the device, the top wall insulated and including a catch, the catch designed for receipt within the second aperture of the sidewall, the engagement of the catch within the second aperture securing the top wall to a closed position, wherein the end walls, sidewalls, and top wall form a substantially rectangular perimeter of the device and enclose and define an interior of the device in an assembled position, and capable of transitioning to a folded and substantially flattened position when not in use;
    a lantern, the lantern positioned within the interior of the device in an assembled position and in communication with a tube, the tube extending from the interior of the device through the second notch in the sidewall to an exterior of the device and removably affixed to a gas canister, the lantern providing heat and illumination to the device; and
    a spool, the spool received in the notch and horizontal aperture of the first end wall and providing for the placement of fishing line, the spool having a reflective surface on a side of the spool aligned to face the interior of the device, wherein the spool reflects light generated from the lantern.

4. A device as in claim 3, wherein the device is sized for receipt within a standard five-gallon bucket when in the folded position.

5. A device as in claim 3, wherein the end walls, side walls, and top walls are constructed out of aluminum.

* * * * *